(No Model.) 5 Sheets—Sheet 2.
W. W. REYNOLDS.
PLATFORM SCALE.
No. 296,451. Patented Apr. 8, 1884.
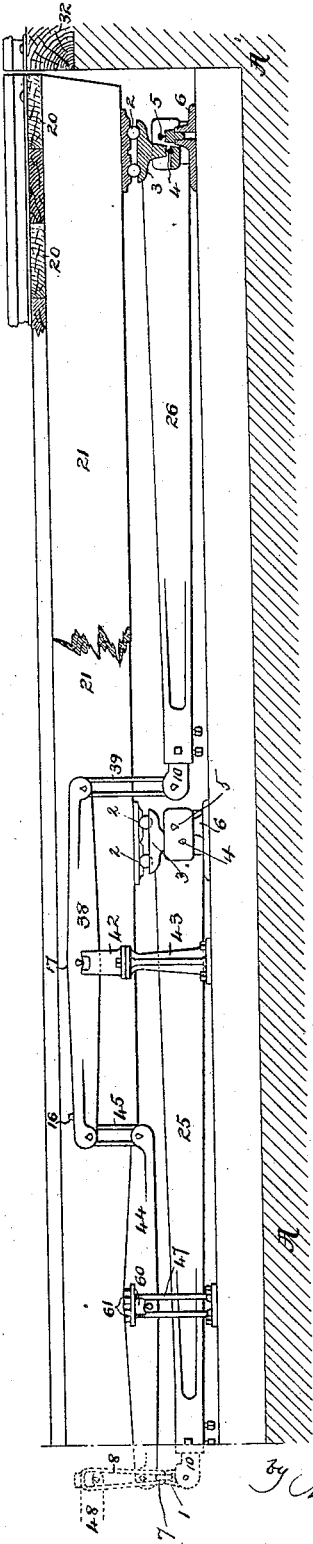

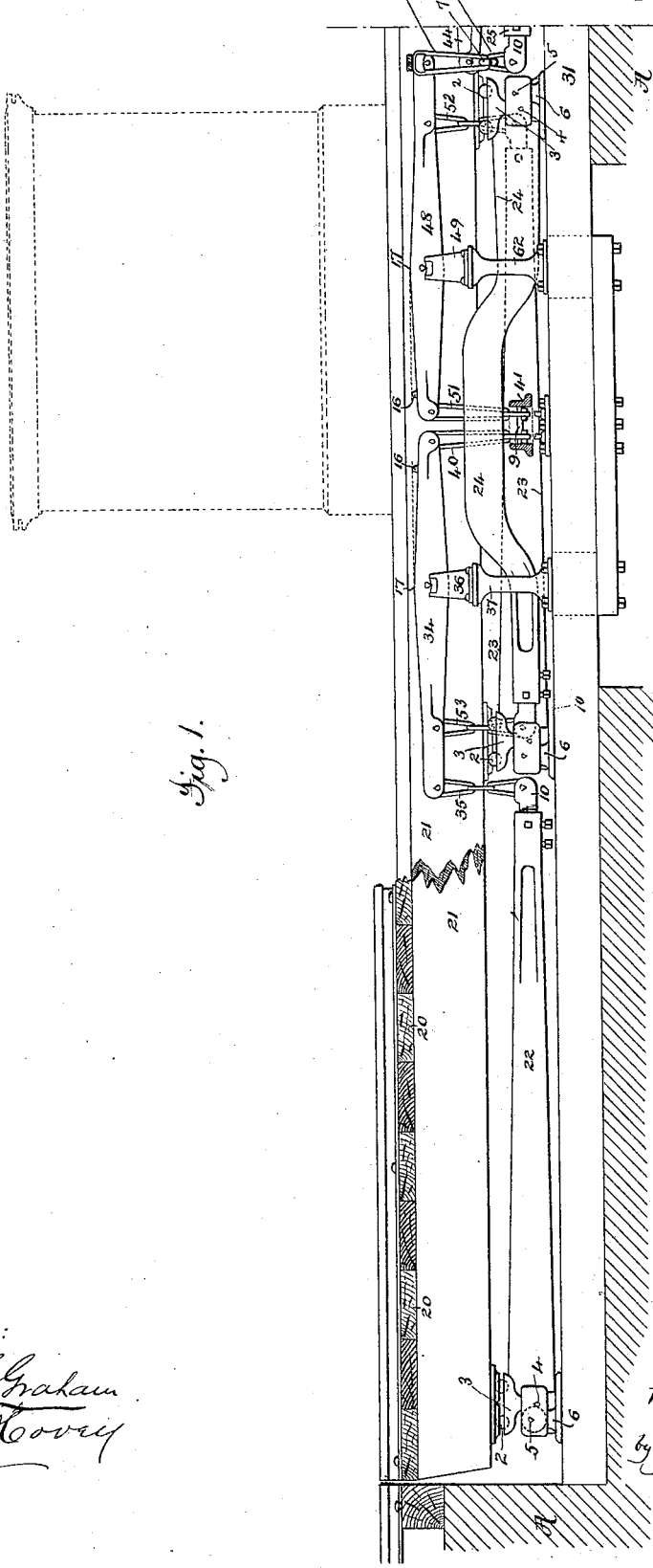

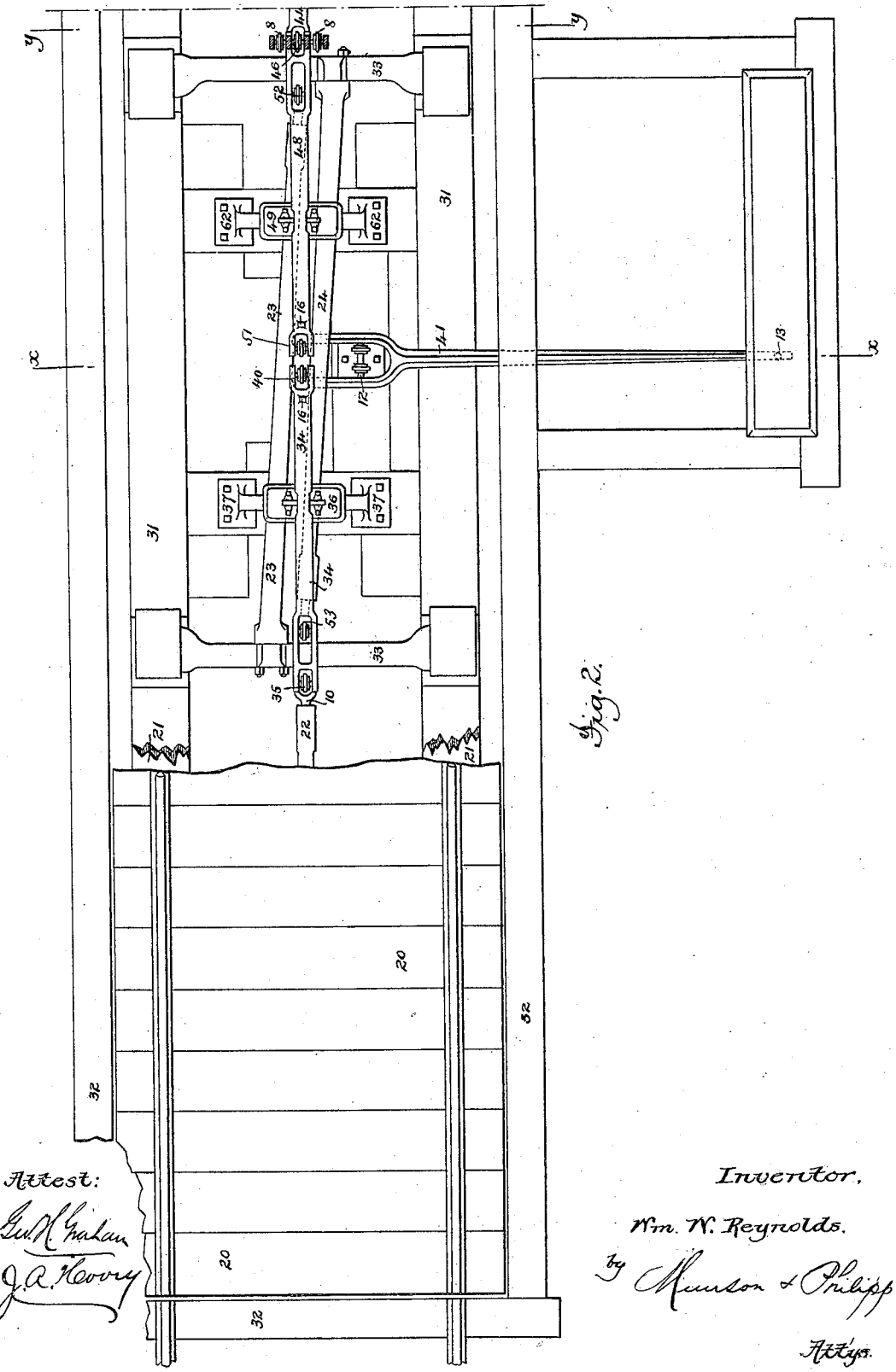

(No Model.) 5 Sheets—Sheet 4.

W. W. REYNOLDS.
PLATFORM SCALE.

No. 296,451. Patented Apr. 8, 1884.

Attest:
Geo. H. Graham
J. A. Hoory

Inventor,
Wm. W. Reynolds,
by
Murdon † Philipp
Attys.

(No Model.) 5 Sheets—Sheet 5.

W. W. REYNOLDS.
PLATFORM SCALE.

No. 296,451. Patented Apr. 8, 1884.

Attest:
G. W. Graham
J. A. Hoory

Inventor.
Wm. W. Reynolds,
by Munson & Philipp
Attys.

UNITED STATES PATENT OFFICE.

WILLIAM W. REYNOLDS, OF RUTLAND, VERMONT, ASSIGNOR TO THE HOWE SCALE COMPANY, OF SAME PLACE.

PLATFORM-SCALE.

SPECIFICATION forming part of Letters Patent No. 296,451, dated April 8, 1884.

Application filed August 10, 1883. (No model.)

*To all whom it may concern:*

Be it known that I, WILLIAM W. REYNOLDS, a citizen of the United States, residing in the city of Rutland, county of Rutland, and State of Vermont, have invented certain new and useful Improvements in Platform-Scales, fully described and represented in the following specification and the accompanying drawings, forming a part of the same.

This invention relates, generally, to that class of platform-scales which are supported on suitable foundations depressed below the surface of the ground, and in which the platform upon which the load to be weighed is placed is on a level with the surrounding surface, but more particularly to those scales which are designed for weighing railway-cars and their contents, and in which the platform of the scale carries the rails of the track over which the car passes. In scales of this class it is of course necessary that the platform should be of a length at least equal to that of an ordinary railway-car, and to obtain this comparatively large dimension it has been found necessary, in the constructions heretofore employed, to make the levers upon which the platform rests correspondingly long. This in practice has been found very objectionable, as by reason of their great length these levers are liable to spring and become so distorted as to throw their knife-edges out of level, and thus destroy the accuracy of the scale.

It is the object of the present invention, among other things, to overcome this difficulty, and to provide a scale which will be strong and simple in construction, and which can be constantly maintained in accurate working condition.

To this end the invention consists in a system of levers and connections so arranged that the length of the individual levers may readily be reduced within limits which will overcome the tendency to spring and get out of level, while at the same time the system may be extended indefinitely, so as to support a platform of any desired length.

The invention also embraces various details of construction and combinations of parts by which this result is effected, all of which will be hereinafter fully explained, and particularly pointed out in the claims.

Figure 2:
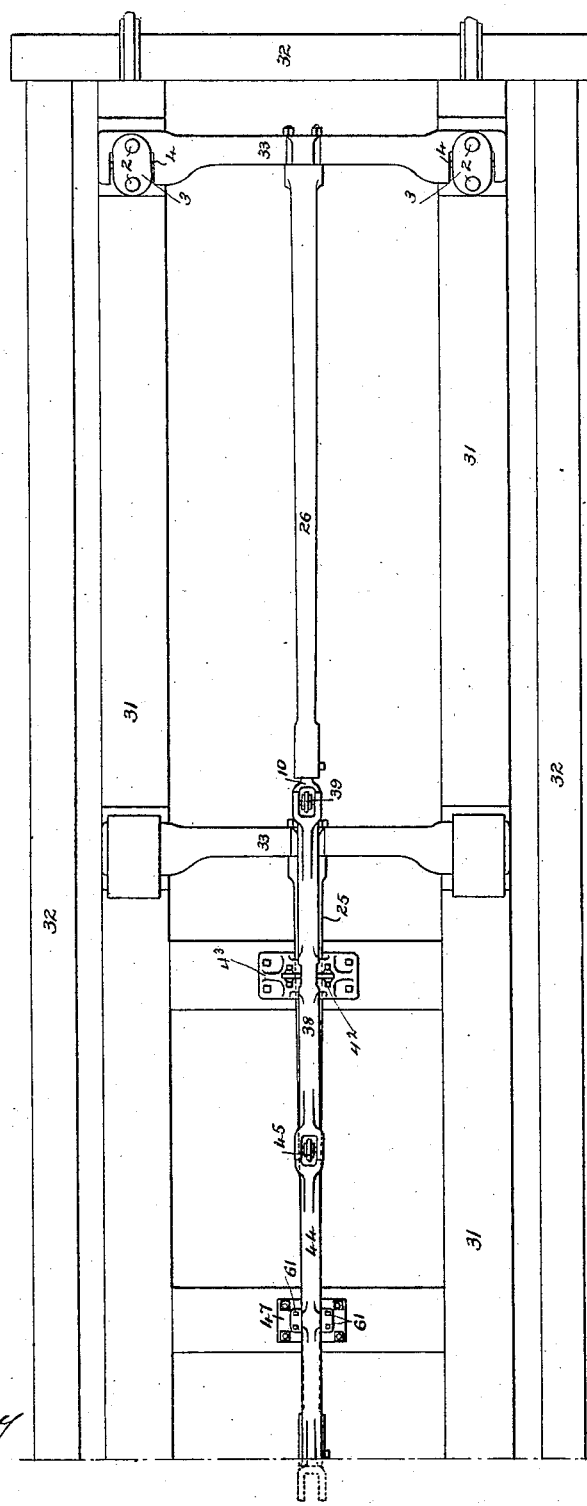
Figure 4:
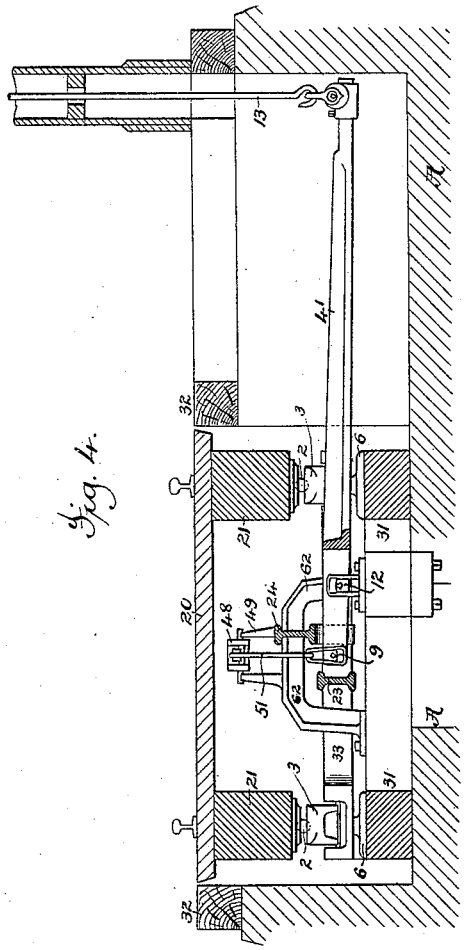
Figure 3:
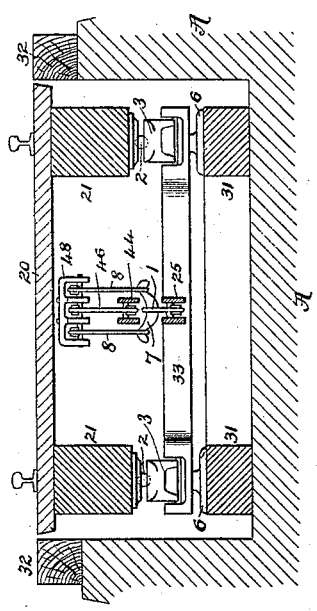

In the accompanying drawings, Figures 1 and 1* are a longitudinal elevation of a scale embodying the invention, portions of the platform, supporting-beams, and foundation being broken away, and other parts being shown in section to more fully expose the operative parts. Figs. 2 and 2* are a plan view of the same, a portion of the platform being removed. Fig. 3 is a cross-section taken upon the line $y\ y$ of Fig. 2, and Fig. 4 is a like view taken upon the line $x\ x$ of the same figure.

Referring to said drawings, it is to be understood that the platform, composed of the planks 20, is supported upon two beams, 21, extending longitudinally of the scale, and supported, as is usual, upon the cross-heads 33 of a series of mounting-levers, 22, 23, 24, 25, and 26. The cross-heads 33 are provided at their opposite ends with the usual knife-edge pivots, 5, which rest upon supports 6, rising from longitudinal beams 31, resting upon the foundation A, which surrounds the scale, and the beams 21 and cross-heads 33 are provided with the usual interposed ball-and-socket bearings, 2 3, which rest upon knife-edge pivots 4 in the ends of the cross-heads, all as clearly shown in Figs. 1 and 1*. The mounting-levers are fulcrumed at suitable distances from each other, and are preferably arranged so as to lie beneath the longitudinal center of the scale-platform. The levers 22 26 support the extreme ends of the platform, and are connected as follows: The lever 22 is connected to one end of an extension-lever, 34, by means of a shackle, 35, which is provided with suitable shoes, upon which bear the knife-edge pivots in the ends of both the levers. The lever 34 is pivoted centrally, or nearly so, on a vertical standard, 36, which is bolted to a support, 37, which rises from the foundation of the scale, and is so formed as to bridge the space occupied by the levers 23 24. The opposite end of the lever 34 is connected through its knife-edge and a shackle, 40, to one of the knife-edge pivots 9 in the bifurcated end of a cross-lever, 41, which is connected through a rod, 13, in the usual manner, with the weighing-beam of the scale. The mounting-lever 26 is connected, through its knife-edge pivot and a shackle, 39, to a similar pivot in one end of an extension-lever, 38, which is pivoted on a standard, 42, bolted to a support, 43, which rises from the foundation of the scale, and is so formed as to bridge the space occupied by the lever 25. The opposite end of the lever 38 is connected by a shackle, 45, with one end of a second extension-lever, 44, the opposite end of which is connected by a shackle, 46, (see Figs. 2 and 3,) with one end of a third extension-lever, 48, the opposite end of which is connected by a shackle, 51, with the other knife-edge pivot 9 in the end of the cross-lever 41. The support 47, in which the lever 44 is pivoted, is provided with shoes 60, against which the knife-edge pivots of the lever rest, and with nuts 61, by which the shoes 60 can be raised or lowered to bring the lever to the proper height to level the several levers with which it is connected. The lever 25, which is located in line with the lever 26 and passes under the support 43 and the extension-lever 44, is connected at its free end, by a link, 1, yoke 7, and double shackle 8, to the triple-pivot end of the lever 48, by which connection the pivot in the end of the lever 25 can underlie that in the end of the lever 44 and the two be connected to the lever 48 at the same point. The lever 48, like the lever 34, is pivoted upon a standard, 49, which is bolted to a support, 62, which, like the support 37, rises from the foundation of the scale, and is so formed as to bridge the space occupied by the levers 23 24. The form of the standard 49 and support 62 is clearly shown in Fig. 4, and it is to be understood that the standards 36 42 and supports 37 43, before referred to, are of exactly the same form, except that the support 43 is not so much spread. The levers 23 24 pass under the supports 37 62 and lie side by side and parallel to each other, they being, however, fulcrumed at opposite ends and set at a slight inclination to their axes and to the body of the scale, so as to allow their free ends to underlie the extension-levers 48 34, to which they are connected by shackles 52 53. The lever 24 is suitably curved or bent to pass over or, if preferred, under the end of the cross-lever 41, so that said levers will not interfere with each other in their vibratory movements. The knife-edge pivots in the ends of the several mounting-levers are preferably made adjustable by means of extension-pieces, as 10, which are adjustably secured to the ends of the several levers in any convenient manner, as indicated in Figs. 1 and 1*. By means of this adjustability these pivots may be brought into proper position with relation to the pivots in the ends of the extension-levers without the necessity of changing the positions of their supports. The extension-levers may be provided with leveling-points, as 16 17, upon which a suitable level or straight-edge can be placed when it is desired to properly adjust the various parts.

The operation of the apparatus is as follows: As the platform is depressed by the weight of the load to be weighed, the levers 22, 23, 24, 25, and 26 will be caused to rock slightly upon their pivots, and thus carry their free ends downward. This movement of the levers 22 24 will, through the shackles 35 53, rock the lever 34, which movement will, through the shackle 40, be communicated to the lever 41. The movement of the lever 26 will, through the shackle 39, lever 38, shackle 45, lever 44, and shackle 46, be communicated to the lever 48. The movements of the levers 23 25 will, through shackles 52 8, be likewise communicated to the same lever, 48, which, through shackle 51, will transmit the motion thus received from the several levers to the lever 41, which will thus be caused to rock upon its pivot 12, and through the vertical rod 13 transmit the motion received from the several mounting-levers to the scale-beam.

It will be readily seen that the herein-described system of levers may by duplication be extended indefinitely, so as to accommodate a platform of any desired length.

What I claim is—

1. In a weighing-scale, the combination, with the two mounting-levers 23 24, arranged side by side and fulcrumed at opposite ends, of the cross-lever 41, the extension-levers 48 34, and connections, substantially as described.

2. In a weighing-scale, the combination, with the two mounting-levers 23 24, arranged side by side and fulcrumed at opposite ends, and occupying an inclined or oblique position with relation to the body of the scale, of the cross-lever 41, the extension-levers 48 34, and connections, substantially as described.

3. In a weighing-scale, the combination, with the mounting-lever 24, of the cross-lever 41, the extension-lever 34, and connections, said mounting-lever being curved to pass said cross-lever, substantially as described.

4. In a weighing-scale, the combination, with the two mounting-levers 23 24, arranged side by side and fulcrumed at opposite ends, of the mounting-lever 25, the cross-lever 41, the extension-levers 34 48, and connections whereby the vibrations of said mounting-levers are transmitted to said cross-lever, substantially as described.

5. In a weighing-scale, the combination, with the mounting-levers 25 26, arranged in line, of the cross-lever 41, the extension-levers 38, 44, and 48, and connections whereby the vibrations of said mounting-levers are transmitted to said cross-lever, substantially as described.

6. In a weighing-scale, the combination, with the two mounting-levers 23 24, arranged side by side and fulcrumed at opposite ends, of the mounting-levers 25 26, arranged in line with each other and with the levers 23 24, the cross-lever 41, the extension-levers 34, 48, 44, and 38, and connections whereby the vibrations of said mounting-levers are transmitted to said cross-lever, substantially as described.

7. The combination, with the levers 25 and 44, provided with single knife-edge pivots, of the lever 48, provided with a triple knife-edge pivot, the yoke 7, and the shackles 1, 46, and 8, substantially as described.

8. The combination, with the extension-levers 38 48, of the intermediate extension-lever, 44, and means for vertically adjusting said last-named lever, substantially as described.

9. The combination, with the mounting-levers 23 24 and the extension-levers 34 48 and cross-lever 41, of the supports 37 62, formed to bridge said mounting-levers, and connections whereby the vibrations of said mounting-levers are transmitted to said cross-lever, substantially as described.

In testimony whereof I have hereunto set my hand in the presence of two subscribing witnesses.

WM. W. REYNOLDS.

Witnesses:
JOHN F. MERRILL,
GEO. A. MERRILL.